United States Patent [19]

Janik

[11] Patent Number: 5,203,994
[45] Date of Patent: Apr. 20, 1993

[54] FUEL FILTER RETENTION SYSTEM

[75] Inventor: Leon P. Janik, Suffield, Conn.
[73] Assignee: Stanadyne Automotive Corp., Windsor, Conn.
[21] Appl. No.: 746,693
[22] Filed: Aug. 16, 1991
[51] Int. Cl.$^5$ ............................................. B01D 27/00
[52] U.S. Cl. ................................... 210/232; 210/438; 210/454
[58] Field of Search ............... 210/232, 352, 435, 440, 210/444, 454, 437–439; 220/293, 301, 302

[56] References Cited

U.S. PATENT DOCUMENTS

| | | | |
|---|---|---|---|
| 3,502,221 | 3/1970 | Butterfield | 210/444 |
| 4,992,166 | 2/1991 | Lowsky et al. | 210/232 |
| 5,017,285 | 5/1991 | Janik et al. | 210/454 |

FOREIGN PATENT DOCUMENTS

| | | | |
|---|---|---|---|
| 257891 | 8/1963 | Australia | 210/444 |
| 1296051 | 11/1972 | United Kingdom | 210/444 |

*Primary Examiner*—Matthew O. Savage
*Attorney, Agent, or Firm*—Chilton, Alix & Van Kirk

[57] ABSTRACT

A fuel filter assembly employs a retainer collar for locking the disposable cartridge to the base. The base and the retainer collar are configured with a pair complementary spiral ramp-like structures. The retainer collar is rotatable so that the catches are positioned in slots of the base for locking the cartridge to the base. A spring washer biases the retainer collar into the locked position.

22 Claims, 6 Drawing Sheets

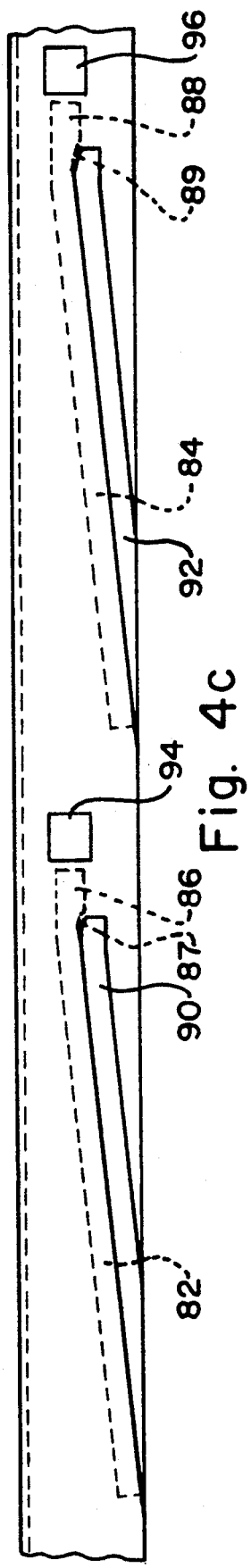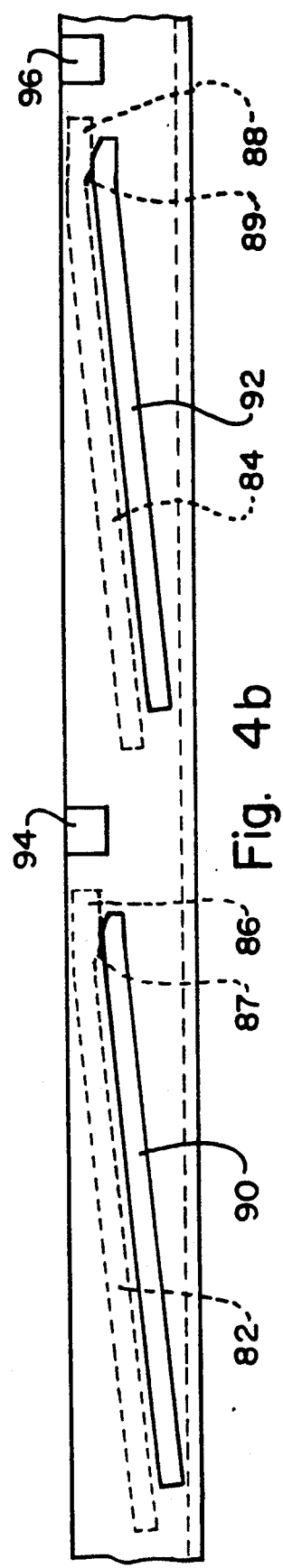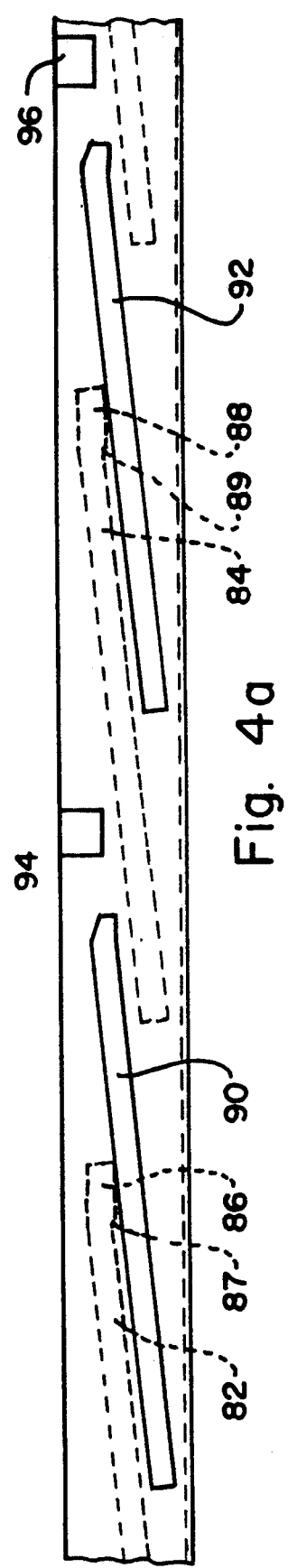

FUEL FILTER RETENTION SYSTEM

BACKGROUND OF THE INVENTION

This invention relates generally to devices for filtering and separating liquids. More particularly, the present invention relates to fuel filters for removing foreign particles and separating water from fuel in the fuel supply systems of an internal combustion engine.

The absence of high standards and quality control in diesel fuel supplies dictates that an effective fuel filter be incorporated into the fuel supply system of the diesel engine. It is not uncommon for diesel fuel to have significant quantities of abrasive particles and water. The abrasive particles present the potential for permanent damage to components of the fuel injection pump. In addition, the abrasive particles can adversely effect the performance of the pump by destroying the ability of the fuel injection pump to precisely meter and deliver fuel at high pressures. The presence of water in the diesel fuel supply can cause corrosion of engine components, and during freezing conditions, can result in interruption of the fuel injection system and/or seizure of moving components.

Fuel filters commonly employ a disposable filter cartridge which is replaced at pre-established intervals of filter usage. There are a wide variety of fuel filter cartridge configurations and orientations. The replaceable cartridge is conventionally secured to the base and/or locked to the base by a locking mechanism which is releasable to allow for removal of the cartridge for replacement purposes.

In U.S. Pat. No. 5,017,285, which is assigned to the assignee of the present invention, one disclosed inverted fuel filter assembly employs a base which mounts to the vehicle and a disposable filter cartridge which is suspended directly below the filter base. The cartridge is retained to the base by a threaded collar. The collar includes a rim which retentively engages against a roll seam structure at the periphery of the cartridge housing. The collar threads to the base. The cartridge is replaced by loosening the threaded collar and dismounting the filter cartridge.

While conventional retainer devices perform in an acceptable manner, the conventional threaded locking can introduce uneven loading between different fuel filter assemblies as well as within a given fuel filter depending upon the degree of tightening or torque applied to the retainer collar. In addition, the threads are subject to exposure to various fluids and particulate matter which may seriously jeopardize the integrity and efficiency of the threaded engagement. In the field, it is often problemmatical to ascertain the proper torque or tightening technique that should be applied to properly secure the cartridge to the base. Improper loading can effect the sealing integrity of the fuel filter system and the structural integrity of the cartridge, thereby jeopardizing the effectiveness of the fuel filter and/or diminishing the useful life of the fuel filter.

SUMMARY OF THE INVENTION

Briefly stated, the invention in a preferred form is a retention system for a fuel filter assembly of a type comprising a base, a disposable cartridge and a retainer collar which locks the cartridge to the base. The base has an inverted cup-like receiving skirt. A spiral ramp extends at the exterior of the skirt. A stop is angularly spaced from an upper end of the ramp so as to define a detentive slot. The disposable cartridge houses one or more filter elements and is partially receivable by the base skirt. The cartridge has a peripheral engagement flange. The retainer collar has a shoulder which is engageable against the flange and an integral inner spiral follower which terminates in a catch. The follower is slidably engageable against the base ramp. As the collar is angularly rotated, the follower rides the base ramp until the catch engages the stop and is positively captured in the slot and the follower seats against the ramp to thereby releasably lock the cartridge to the base.

In one embodiment, the base has two substantially identical spiral ramps. The base and the collar has two substantially identical spiral followers and the collar followers may engage in surface-to-surface contact which extends in excess of 180° in the locked position. A spring may function to bias the catch to the locked position. In one form of the invention, the spring is a spring washer which has an inscribed star-like configuration. The spring washer has two alternating sets of spring leaves. One of the sets is engageable against the disposable cartridge and the second set is engageable against the base. The washer also has a peripheral portion which is engageable against radially outer portions of the received end of the cartridge. In one embodiment, the spring washer has eight spring leaves. The spring washer may be retained to the base by means of a retainer ring. The ring is crimped to an axial conduit which provides fluid communication between the cartridge and the base.

An object of the invention is to provide a new and improved retention system for releasably retaining a disposable cartridge to the base of a fuel filter.

Another object of the invention is to provide a new and improved fuel filter retention system which implements a more uniform loading between the cartridge and the base.

A further object of the invention is to provide a new and improved fuel filter retention system wherein the disposable cartridge may be positively locked to the base and released from the base for replacement in a reliable and efficient manner.

Other objects and advantages of the invention will become apparent from the drawings and the specification.

BRIEF DESCRIPTION OF THE DRAWINGS

FIGS. 4a, 4b and 4c are schematic representations illustrating the retention engagement provided by the retention system of FIG. 1;

DETAILED DESCRIPTION OF THE PREFERRED EMBODIMENT

Figure 1:
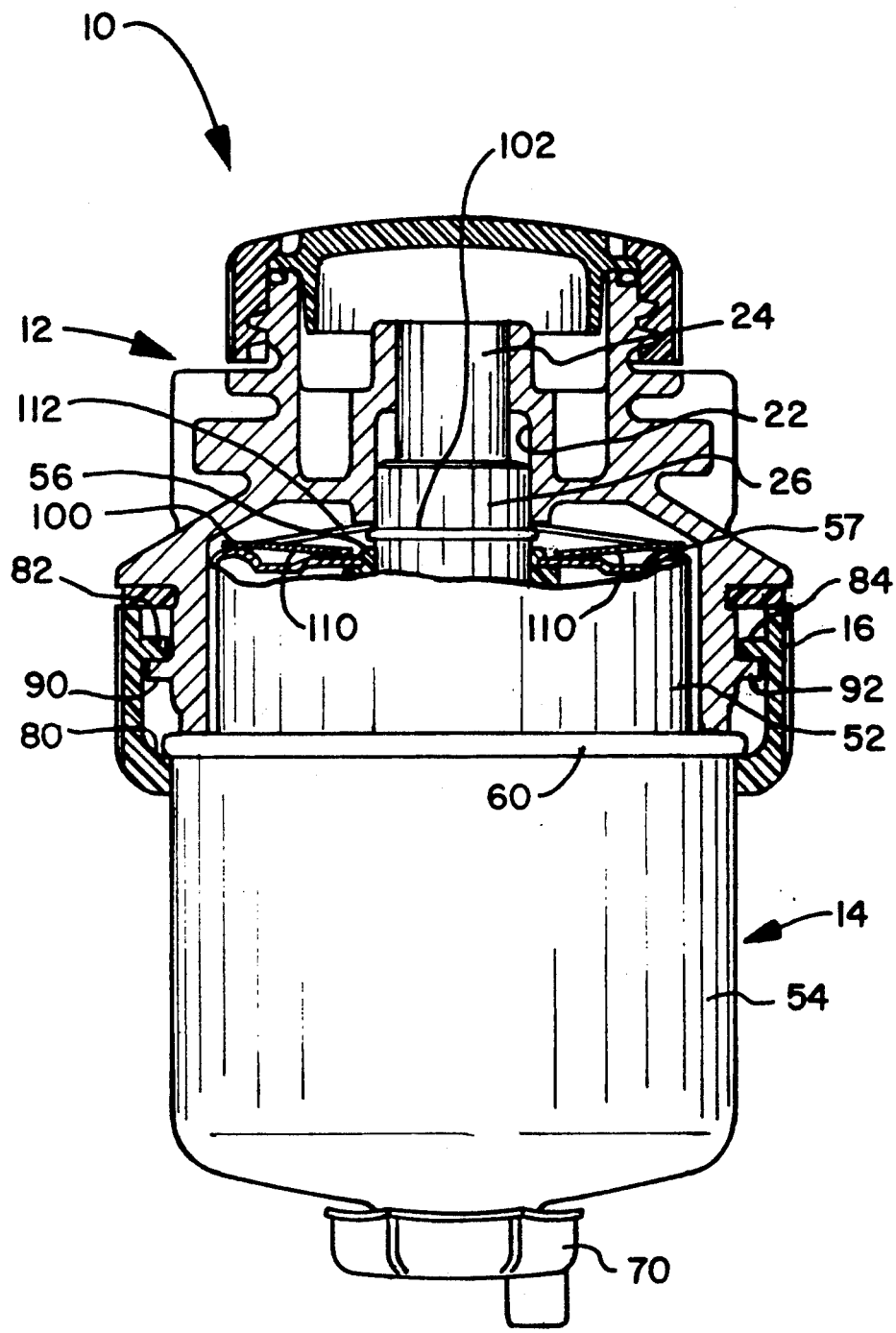
FIG. 1 is an elevated sectional view, partly broken away, of a fuel filter assembly incorporating a retention system in accordance with the present invention.
Figure 2:
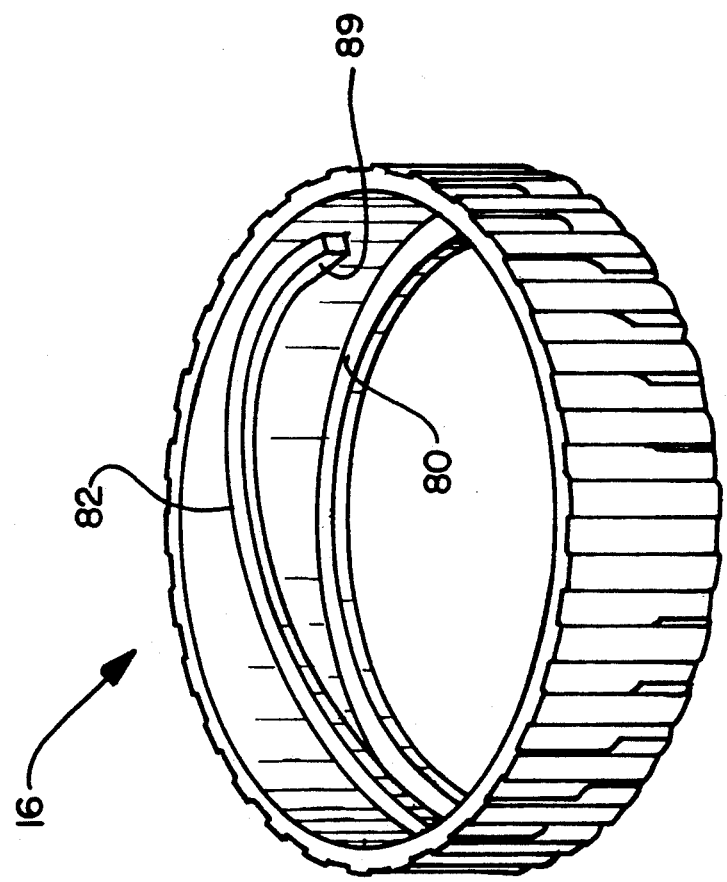
FIG. 2 is a perspective view of a retainer collar employed in the fuel filter assembly of FIG. 1.
Figure 3:
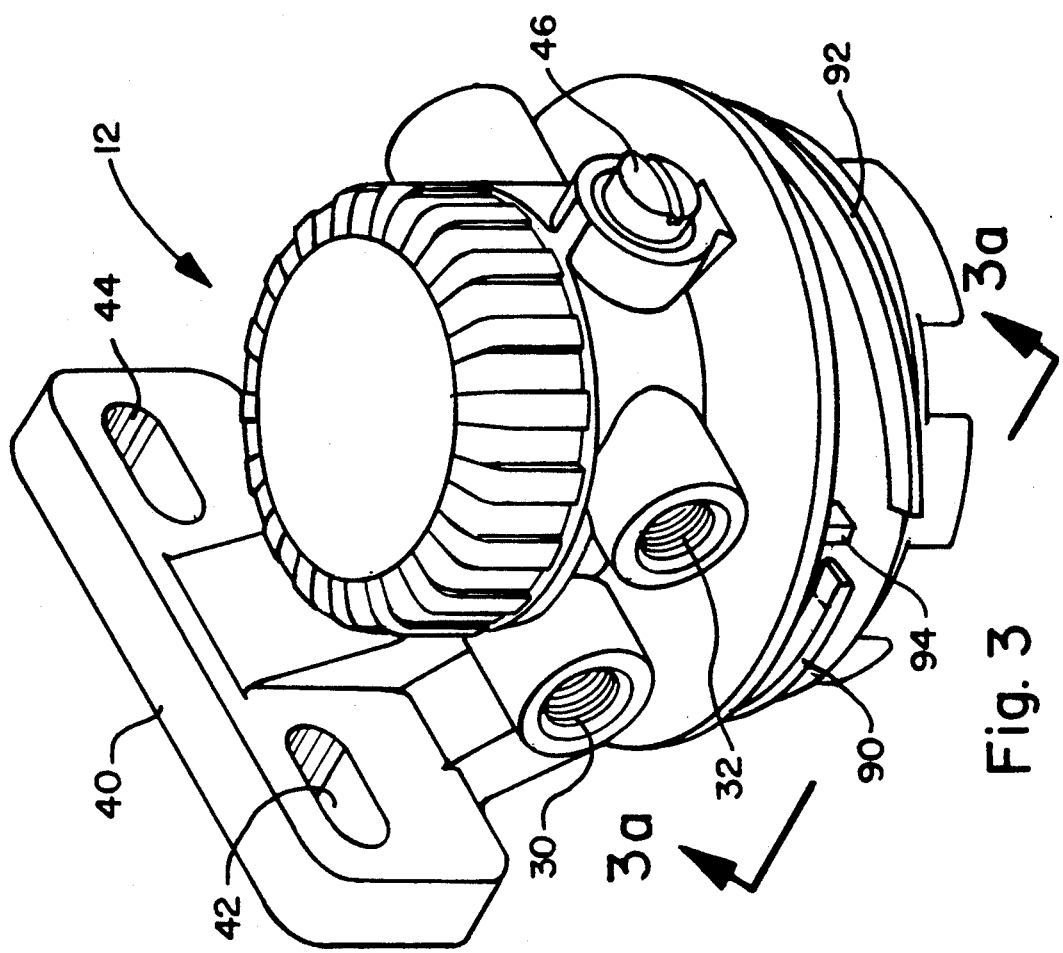
FIG. 3 is a perspective view of a base employed in the retention system of FIG. 1.
Figure 3A:
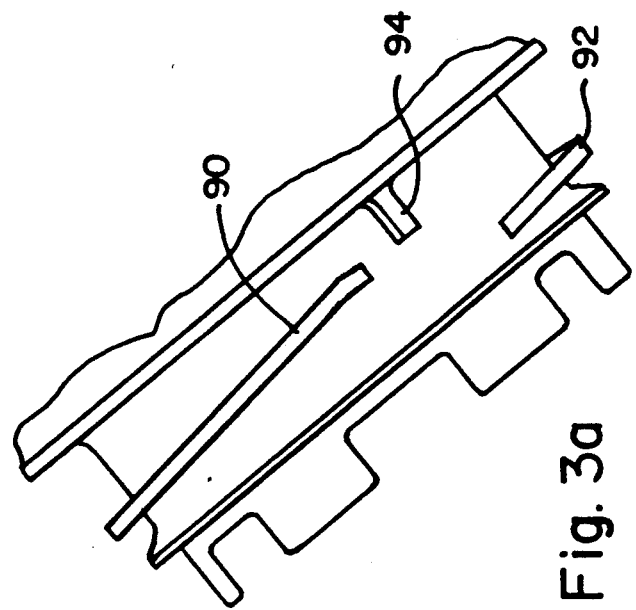
FIG. 3a is a fragmentary side view of the base of FIG. 3 viewed in the plane 3a—3a thereof.
Figure 5:
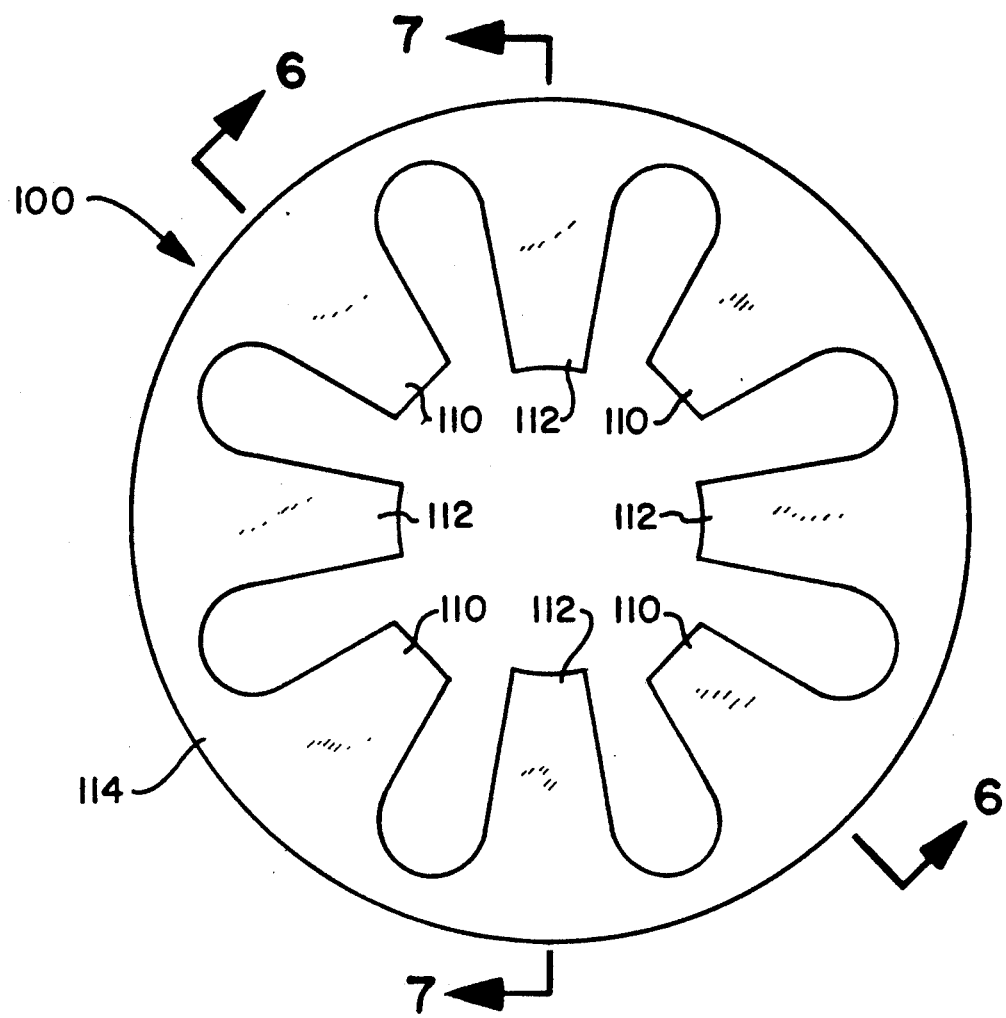
FIG. 5 is an enlarged top plan view of a spring employed in the retention system of FIG. 1.

With reference to the drawings wherein like numerals represent like parts throughout the several figures, a fuel filter assembly in accordance with the present invention is generally designated by the numeral 10. Fuel filter assembly 10 comprises a base 12 and a disposable cartridge 14. The fuel filter assembly is especially adapted for incorporation into the fuel supply system of an internal combustion engine (not illustrated), such as a diesel engine, for removing particulate matter from the fuel and for separating water from the fuel. The base is disposed generally above the disposable filter cartridge which is locked to the base by means of a retainer collar 16.

The base 12 and the disposable cartridge 14 may assume a wide variety of configurations. For the disclosed embodiment, the base 12 is an inverted cup-like receptacle which forms a skirt defining a lower receiving cavity for upper portions of the disposable cartridge. A central stepped axial bore 22 in the base closely receives an elongated sleeve-like conduit 24 and an outer concentric sleeve-like conduit 26. The conduits provide generally coaxial fluid communication between the base and the disposable cartridge. An inlet connector 30 at an upper side location of the base connects with the fuel line to provide fluid communication through the passageway defined by the first conduit 24. An outlet connector 32 at an upper side location of the base connects with a fuel line to provide external fluid communication from the axial fluid conduit defined between the first and second conduits 24 and 26. An integral projecting bracket 40, which may include a pair of openings 42,44 for anchoring the filter base to the engine header, projects transversely from the base. Alternately, the base does not have a bracket structure but merely has a pair of fastener openings. The base may also have an air vent 46.

The disposable filter cartridge 14 comprises a can-like container comprising a pair of lower and upper cup-like sections 52,54, which are joined along a circumferential roll seam 60. The upper section 52 is smaller in diameter than the lower section. The upper section 52 is received in the base receptacle and includes a central axial opening. The upper section 52 is dimensioned so that is is closely accommodated in the base receptacle. In one embodiment, the distance between the adjacent receptacle and cartridge side surfaces is on the order of 0.0075 inches. A sealing grommet 56 mounted at the opening diametrally seals against the outer conduit 26. An integral annular lip 57 projects from the top surface of the section 52.

In conventional fashion, a secondary filter element (not illustrated) which has a continuous fan-shape pleated configuration is mounted in the upper section. A lower end of the secondary element is engaged by a medial plate which has a central recess. A second sealing grommet mounted at the recess diametrally seals against the first conduit 24. The primary filter element, which also has a continuous fan-like configuration, engages the underside of the medial plate and is retained by a lower plate. The primary element is housed in the lower section 54. A sump is formed at the bottom of the lower section to collect water which coalesces from the fuel. The foregoing filters, elements, support structures and sealing elements are conventional and are not illustrated in the drawings. A drain cock 70 is disposed in the lower portion of the cartridge for draining the water.

With additional reference to FIGS. 2, 4a, 4b and 4c, the retainer collar 16 includes an inwardly projecting annular shoulder 80 which engages the roll seam 60 of the cartridge for retentively locking the disposable cartridge to the base. The collar includes at least one and preferably a pair of diametrically disposed spiral followers 82 and 84 which integrally extend inwardly from the collar. The followers respectively upwardly terminate in catches 86 and 88 which protrude downwardly at the upper terminus underside of the ramps 82 and 84. The lower trailing portions of the catches have tapered contoured surfaces 87 and 89.

With reference to FIGS. 3, 3a, 4a, 4b and 4c, the base includes a pair of integral outwardly projecting, diametrically disposed ramps 90 and 92. Each of the ramps ascends in spiral-like fashion in excess of 90° around the base. The upper ends of the ramps are beveled. Stops 94 and 96 are angularly spaced from the respective upper ends of the ramps so that a retentive slot is defined between the upper beveled end of each ramp and the end of the corresponding stop. The followers 82, 84 including the catches 86, 88 of the collar are dimensioned and positionable for engagement with the ramps 90, 92 and stops 94, 96 of the base, so that the followers 82, 84 slideably engage and ascend the ramps 90,92 upon alignment and angular rotation of the collar as illustrated in FIG. 4a. The maximum elevated relationship between the followers and ramps is illustrated in FIG. 4b. As the collar continues to rotate, both of the catches 86,88 positively seat in the slots. The inclination angle of the upper surfaces of the ramp and the underside surfaces of the followers are constant and substantially equal. The upper ramp surfaces of the base ramps and the underside surface of the retainer collar followers engage along an extended substantially surface-to-surface interface, as best illustrated in FIG. 4c. The locked position of FIG. 4c may be facilitated by the leading end of the catches 86 and 88 engaging the stops 94 and 96, respectively.

Figure 6:
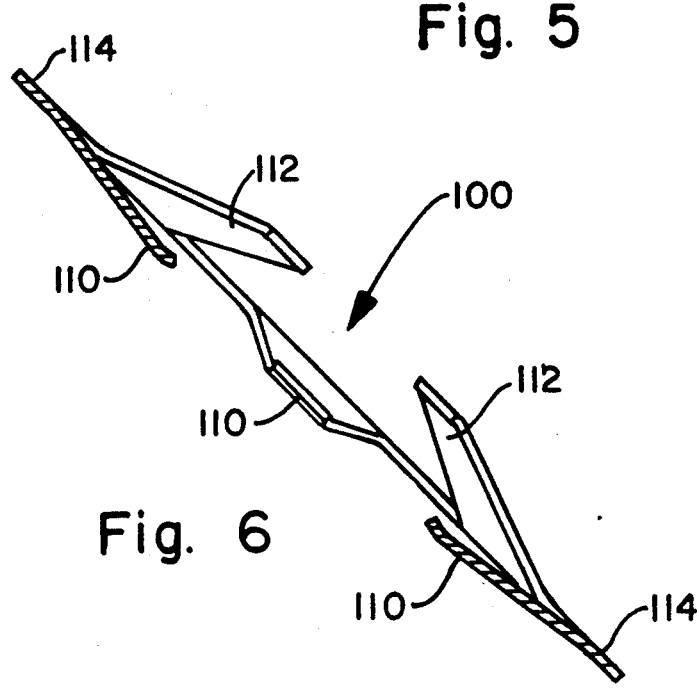
FIG. 6 is a sectional view of the spring of FIG. 5 taken along the line 6—6 thereof.
Figure 7:
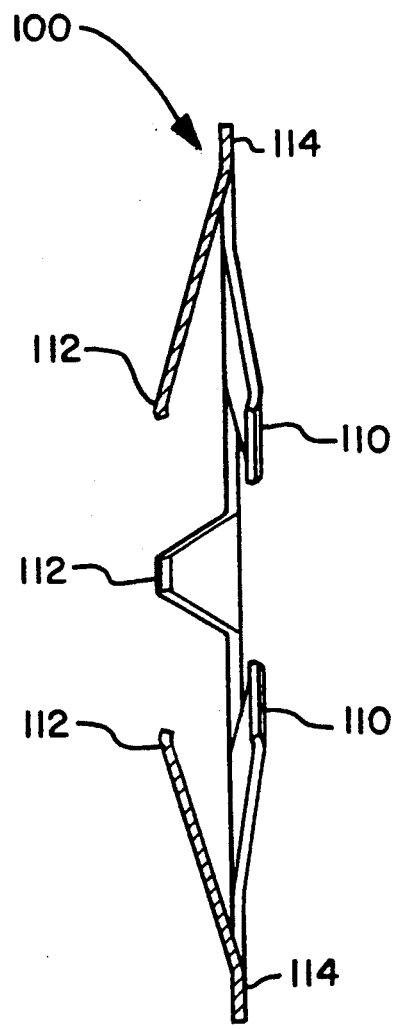
FIG. 7 is a sectional view of the spring of FIG. 5 taken along the line 7—7 thereof.
Figure 8:
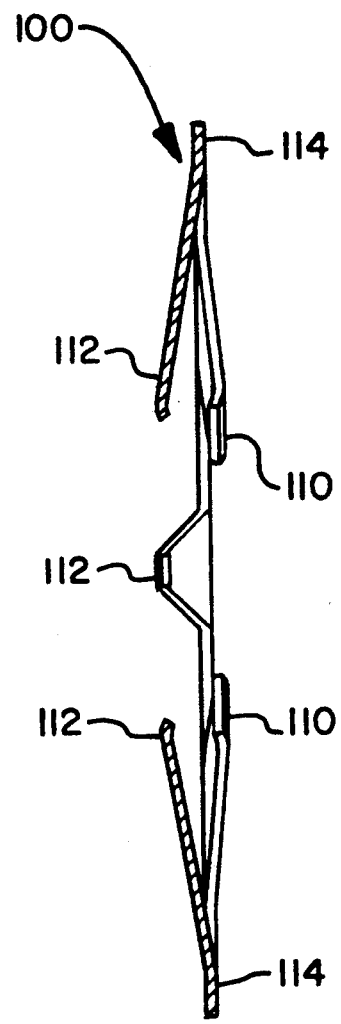
FIG. 8 is a sectional view of the spring of FIG. 5, when the spring is in a loaded state, taken along the line 7—7 thereof.

With additional reference to FIGS. 5-8, the positive locked position is releasably maintained by the force of a spring 100 which is mounted to the base. A preferred embodiment is a spring washer having an inscribed star-like configuration and a central opening dimensioned to accommodate conduit 26. The spring 100 may be retained by a retainer ring 102 which is crimped to the conduit 26. Alternately, the spring may be retained by an integral shoulder formed on the conduit 24. The spring washer includes angularly alternating spring leaves 110 and 112 which are alternately biased as best illustrated in FIGS. 6, 7 and 8. The spring leaves are biased so that the first set engages against an abutment portion of the base, and the second set engages against the top of the disposable cartridge. The multiple spring engagement interfaces function to substantially uniformly distribute the load between the base and the cartridge. In addition, a peripheral shoulder portion 114 of the spring is engageable against the upwardly protruding lip 57 of the disposable cartridge. The spring bias provides the positive releasable locking engagement to urge the catches into the slots to thereby releasably lock the disposable cartridge to the base.

With reference to FIGS. 4a, 4b and 4c, the initial rotation of the collar causes the collar follower and the leading catches to ride up the base ramps as illustrated in FIG. 4a. The catches eventually reach an elevated position above the base ramp as best illustrated in FIG. 4b. The torque applied to the collar is resisted by the bias force of the spring 100. Continued angular rotation of the collar causes the catches to clear the upper ramp ends and/or engage the stops under the spring bias to snap into the retentive slots as illustrated in FIG. 4c. The dwell or locked position is releaseably retained by the bias of the spring 100. In one embodiment, the drop from the elevated FIG. 4b position to the locked FIG. 4c position is on the order of 0.030 inches. The angularly spaced leaves 110, 112 and the peripheral spring shoulder 114 cooperate to generally uniformly distribute the spring bias force by providing multiple spaced engagement locations.

In an alternative embodiment of the invention (not illustrated), the spring 100 is not required. The bias which maintains the locked position is provided by a deformable portion of the retainer collar which is made from metal or other resilient material. The deformable portion imposes a bias when the collar is rotated to the locked position.

It will be appreciated that the foregoing described retention system provides two load carrying paths. The complementary spiral follower and ramp structures provide a relatively large annular engagement surface in the locked position. In one preferred embodiment, the engagement interfaces of the followers and ramps subtend an angle on the order of 300°. The extended engagement surfaces provide for a very stable loaded relationship between the disposable cartridge and the base. The spring washer 100 is also configured so that it contacts a central portion of the disposable cartridge and also provides a secondary contact at an outer peripheral portion to provide stability to the loaded cartridge and thereby eliminate rocking of the cartridge. The bias force which is applied by the leaves 110 at the center portion to the cartridge enhances the resistance of the structure of the cartridge housing so as to effectively resist structural failure resulting from the high pressures that may be applied to the cartridge.

While a preferred embodiment of the foregoing invention has been set forth for purposes of illustration, the foregoing description should not be deemed a limitation of the invention herein. Accordingly, various modifications, adaptations and alternatives may occur to one skilled in the art without departing from the spirit and the scope of the present invention.

What is claimed is:

1. A fuel filter assembly comprising:
   base means comprising a receptacle and ramp means for defining a first spiral ramp at the exterior of said enclosure and a stop angularly spaced from said first ramp and defining a slot therebetween;
   disposable cartridge means mountable to said base means, at least a portion of said cartridge means being receivable in said receptacle, said cartridge means housing a filter element and comprising a peripheral engagement shoulder;
   biasing means for generally axially biasing said cartridge means away from said base means receptacle;
   retainer collar means comprising a retainer portion engageable against said shoulder and follower means comprising a catch at one end thereof, said follower means being engageable with said ramp means so that as said collar means is angularly rotated, said follower means rides said ramp means and said catch moves into said slot under the bias of said biasing means for capture thereby to lock said cartridge means to said base means.

2. The fuel filter assembly of claim 1 wherein said ramp means comprises a pair of diametrically opposed spiral ramps and said follower means comprises a pair of diametrically opposed followers.

3. The fuel filter assembly of claim 2 wherein said ramp means has ramp surfaces and said follower means has follower surfaces and said collar means locks the cartridge means to the base means so that said ramp means and follower means engage in surface-to-surface contact which angularly extends in excess of 180°.

4. The fuel filter assembly of claim 1 wherein said biasing means further comprises spring means engageable against said cartridge means for biasing said catch into position in said slot in said locked position.

5. The fuel filter assembly of claim 4 wherein said spring means comprises a spring washer.

6. The fuel filter assembly of claim 5 wherein said spring washer has a configuration comprising two sets of spring leaves, one set of said spring leaves being engageable against said disposable cartridge means and said second set of spring leaves being engageable against said base means.

7. The fuel filter assembly of claim 6 wherein said spring washer further comprises a peripheral portion which is secondarily engageable against radially outer portions of said cartridge means.

8. The fuel filter assembly of claim 7 wherein said spring washer comprises eight spring leaves.

9. The fuel filter assembly of claim 7 wherein said spring washer is retained to said base means by means of a retainer ring and wherein said base means further comprises a conduit which provides fluid communication between said cartridge means and said base means, said retainer ring being secured to the exterior of said conduit, said spring washer generally surrounding said conduit.

10. A fuel filter assembly comprising:
    base means comprising receiving means defining a receiving cavity and ramp means for forming a first ramp at the exterior of said receiving means and a stop angularly spaced from said first ramp and defining a slot therebetween;
    disposable filter cartridge means mountable to said base means, at least a portion of said cartridge means being receivable in said cavity, said cartridge means housing a filter element and comprising a peripheral first shoulder;
    spring means engageable with said base means and said cartridge means for axially biasing said cartridge means away from said base means; and
    retainer collar means comprising a second shoulder engageable against said first shoulder and an interiorly disposed follower terminating in a catch, said catch being slidably engageable against said first ramp as said collar is angularly rotated so that said catch rides said first ramp and said catch positively moves into said slot under the bias force of said spring means to releasably lock said cartridge means to said base means with said follower resting on said first ramp.

11. The fuel filter assembly of claim 10 wherein said ramp means comprises two substantially identical ramps and said collar means comprises two substantially identical followers.

12. The fuel filter assembly of claim 11 wherein said ramps have first surfaces and said followers have second surfaces and said collar means locks the cartridge means to the base means so that said first surfaces and said second surfaces engage in surface-to-surface contact which extends in excess of 180°.

13. The fuel filter assembly of claim 10 wherein said spring means comprises a spring washer.

14. The fuel filter assembly of claim 13 wherein said spring washer has a configuration comprising two sets of spring leaves, one set of said spring leaves being engageable against said disposable cartridge means and said second set of spring leaves being engageable against said base means.

15. The fuel filter assembly of claim 14 wherein said washer further comprises a peripheral portion which is secondarily engageable against radially outer portions of said cartridge means.

16. The fuel filter assembly of claim 13 wherein said spring washer is retained to said base means by means of a retainer ring and wherein said base means further comprises a conduit which provides fluid communication between said cartridge and said base means, said retainer ring being secured to the exterior of said conduit, said spring washer generally surrounding said conduit.

17. A fuel filter assembly comprising:
base means defining a receiving structure and ramp means at the exterior of said structure for forming a first spiral ramp terminating in a first end;
disposable cartridge means mountable to said base means for housing a filter element, at least a portion of said cartridge means being receivable in said structure, said cartridge means housing a filter element and comprising a peripheral first shoulder;
biasing means for axially biasing said cartridge means from said base means when said cartridge means is mounted to said base means; and
retainer collar means comprising a second shoulder engageable against said first shoulder and an interior follower terminating in a catch, said catch being slidably engageable against said first spiral ramp as said collar is angularly rotated so that said interior follower rides said first spiral ramp and said catch slides by said first end to thereby releasably lock said cartridge means to said base means.

18. The fuel filter assembly of claim 17 wherein said base means comprises a second spiral ramp substantially identical to and diametrically opposed to said first spiral ramp, and said collar means further comprises a second follower terminating in a second catch, said followers being generally diametrically opposed.

19. The fuel filter assembly of claim 18 wherein said first and second spiral ramps have ramp surfaces and said followers have follower surfaces and said collar means locks the cartridge means to the base means so that said ramp surfaces and said follower surfaces engage in surface-to-surface contact which extends in excess of 180°.

20. The fuel filter assembly of claim 17 wherein said spring biasing means comprises a washer having a configuration comprising two sets of spring leaves, one set of said spring leaves engageable against said disposable cartridge means and said second set of spring leaves being engageable against said base means, and said washer further comprises a peripheral portion which is secondarily engageable against radially outer portions of said cartridge means.

21. The fuel filter assembly of claim 17 wherein said base means further comprises a stop spaced from said first end, said catch being engageable against said stop.

22. The fuel filter assembly of claim 17 wherein said first end has a bevelled surface and said catch has a tapered surface which engages said bevelled surface in the locked position.

* * * * *